UNITED STATES PATENT OFFICE.

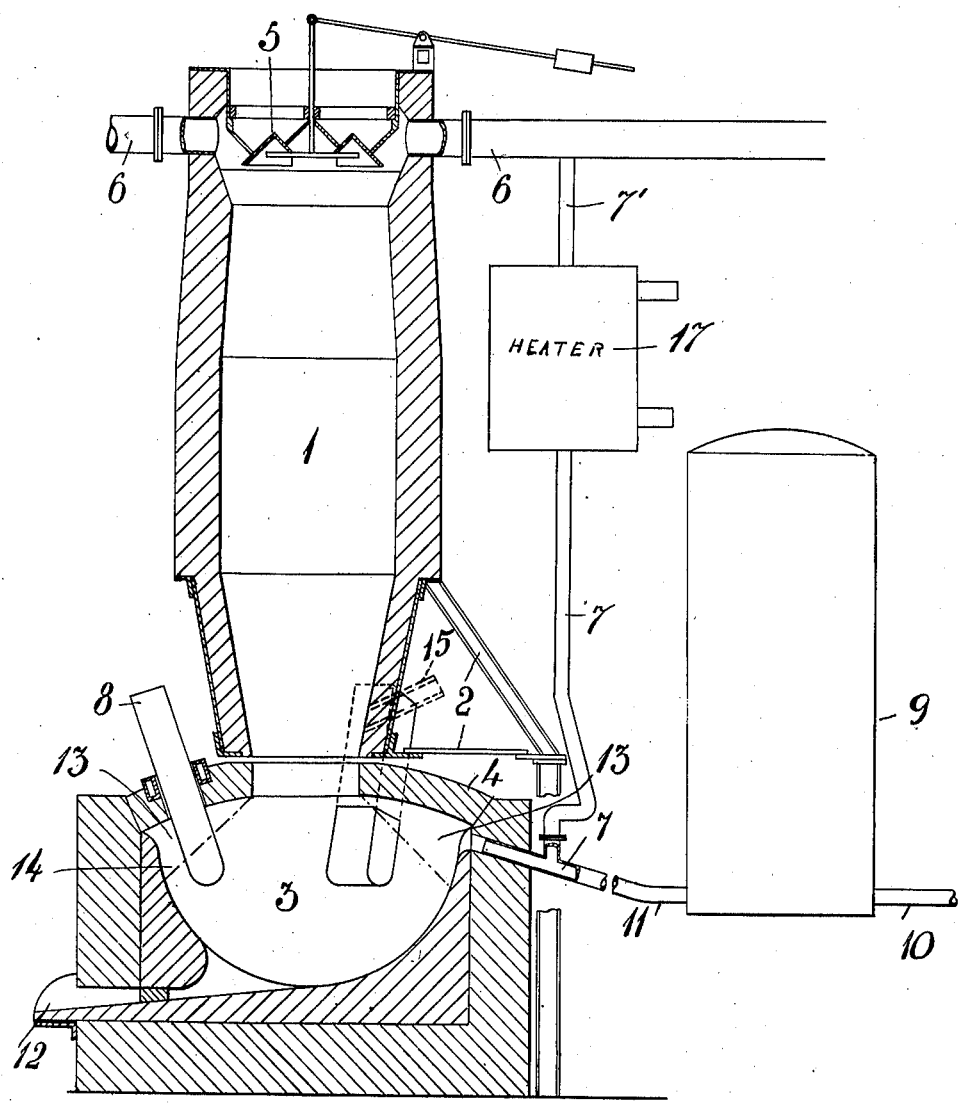

AXEL RUDOLF LINDBLAD, OF LUDVIKA, SWEDEN.

PROCESS FOR THE PRODUCTION OF MALLEABLE IRON DIRECT FROM ORE.

1,058,991. Specification of Letters Patent. Patented Apr. 15, 1913.

Application filed July 16, 1910. Serial No. 572,328.

*To all whom it may concern:*

Be it known that I, AXEL RUDOLF LINDBLAD, engineer, a subject of the King of Sweden, residing at Ludvika, in the Kingdom of Sweden, have invented certain new and useful Improvements in Processes for the Production of Malleable Iron Direct from Ore, of which the following is a specification.

The present invention relates to a method for producing malleable iron direct from ore.

The characteristic feature of the invention is that the ore, mixed with a small amount of reducing materials, is charged into a shaft in form resembling an ordinary blastfurnace shaft. Experience has shown that for obtaining complete reduction more easily it is necessary to mix the ore with a small amount of reducing materials. In this shaft the ore is exposed to the action of reducing gases whereby the said ore is entirely, or at least to a great extent transformed into iron sponge. This iron sponge is then caused without its cooling or coming in contact with the air to descend (or it may be raked down) into an electric furnace directly communicating with said shaft in which furnace the iron sponges are melted. In this manner malleable iron can be produced by a continuous process direct from ore.

Furnaces of various constructions can, of course, be used for carrying out this process, the sole condition being that there be a reducing shaft with a device for introducing the reducing gases, and that this shaft shall communicate with an electric melting furnace of suitable type.

On the accompanying drawing there is shown as an example in vertical section a furnace which may be used for carrying out the present process. This form of the furnace is, however, only to be regarded as an example given with the object of elucidating the description.

As shown by the drawing, the furnace consists of a reduction shaft 1, which is carried by an iron structure 2. Under the shaft there is an electric melting-furnace 3. In the arch 4 which covers the electric furnace or melting chamber there is an opening through which the lower part of the shaft communicates with the interior of the electric melting-furnace.

5 is a furnace mouth of well known construction; 6 are outlets for the gases leaving the shaft; 7 are nozzles through which reducing gases can be forced into the furnace, 8 are electrodes through which the electric energy is supplied to the melting furnace and an apparatus hereinafter described, as employed for generating or regenerating the said reducing gases.

The course of the process is in substance as follows: The shaft is charged with ore with the requisite fluxes and with coke or charcoal. Through the nozzles 7 is blown in a reducing gas, through the agency of which the ore, to a great extent at any rate, is reduced. The iron sponge thus obtained passes through the opening in the arch of the melting furnace down into the electric furnace chamber 3, where it melts through the action of the electric current, whereupon the malleable iron thus obtained can be tapped off through the discharge opening 12. The reducing gases blown into the shaft can be produced in ordinary gas generators, or in some other suitable manner. They can also be obtained by the regeneration of the gases leaving the reduction shaft, which regeneration takes place in a special apparatus. This latter method affords the advantage that the gases are practically free from nitrogen.

In the drawing is shown that the gases are blown into the electric melting furnace in the free spaces which in the furnace drawn arise between the upper sloping surface (indicated with dotted lines 14) of the material into the furnace and the furnace arch 4. From these free spaces the gases then make their way up the shaft. A necessary condition for the application of this arrangement is, however, that the electrodes enter into the material in the melting furnace and do not form free electric light arcs. If such electric arcs were formed, the gases blown-in would by said arcs be heated to a far too great extent. It is, however, naturally by no means necessary that the gases should be blown in in this manner; they may also very well be blown in directly into the lower part of the shaft through the twyers 15 indicated in dotted lines, or in some other manner. The gases to be blown into the furnace are heated or warmed up in a special apparatus, such as the heater shown in the drawing. This apparatus is connected to the outlet pipe 6 and nozzle 7 by means of the pipe 7'. This warming-up may be carried out by electricity or in any of the ways which have hitherto been in common use. The reducing gases which leave the reduction furnace, and are not used for the regeneration, may very well, of course, be used for this warming-up, in case they are not required for other purposes.

As has been above mentioned, the reducing furnace is charged with coke or carbon or other reducing medium together with ore. In case carbon is present, a part of the carbonic acid formed in the reduction dissociates, in case the temperature is sufficiently high, so that from $CO_2$ and $C$ is obtained $2CO$. In this manner the gas in the hotter part of the furnace is kept at a higher percentage of carbonic monoxid, which is particularly favorable for the process of reduction. The quantity of carbon which should be charged together with the ore depends on the nature and quantity of the gas blown in; the temperature in the reducing furnace, etcetera, factors which must be determined for each separate case.

In the construction of furnace shown by way of example on the drawing, the reducing shaft is placed above the melting furnace. By its being so placed, the process is facilitated in so far as the reduced charge sinks down into the melting-chamber of its own accord. This, however, is not a necessary condition for carrying out the process. The melting-furnace may very well be placed by the side of the reducing furnace, but then the material must as a rule be raked from the latter furnace into the former.

The course of the process may, as far as the reducing furnace is concerned, be regulated by the quantity and nature of the gas blown in, by its heating and by the nature of the materials charged and the manner, in which they are charged. In the melting-chamber the process is regulated by the controlling of the supply of electric energy. In case the gases are made to pass the melting-furnace before they enter the shaft or reducing furnace they, of course, also influence the course of the process in the melting furnace. The greatest advantage gained by the process thus described is that malleable iron can be produced directly from ore in a continuous process, whereby the costs for the ready material will be considerably lower than with processes hitherto used.

Experiments have before been made to combine a Lancashire hearth with a reducing furnace so that the reduced material descended direct from the latter into the former. The method tried, however, did not prove to be economical, as the product thus obtained needs in any case to be remelted for making it homogenous and free from slag. These drawbacks do not attach to the process here described, as the product is here obtained from the furnace in a molten condition, and thus free from slag and comparatively homogenous.

A proposal has also been brought forward to reduce iron ore in a shaft-formed melting furnace, in the lower part of which electrodes have been inserted, in such a manner that gas taken from the furnace mouth have been pressed into the lower part of the furnace in the vicinity of the electrodes and close up against the slag where the gas was thought to be regenerated and then bring about reduction of the ore higher up in the shaft. A process of this kind, however, is obviously attended by the inconvenience that it is difficult to keep the temperature in the lower part of the furnace high enough for soft iron to be tapped off, but at the same time the said temperature will be unnecessarily high for the reduction. These difficulties are completely eliminated in the process here described, as the reduction and the melting take place in furnaces or chambers which, though in communication with one another, are distinctly separate. The temperature in the melting-furnace can thus be kept up at the requisite height, without the reducing shaft becoming more heated than is desirable. The gases blown in pass in the present process not near the melted products in the melting-chambers, but in any case only through the free space in the upper part of the furnace.

Having thus described my invention, I declare, that what I claim is:—

1. The herein described process for the production of malleable iron direct from ore which consists in charging a mixture of ore and reducing material into a shaft furnace, heating gases, taken out from the shaft, outside the furnace, introducing said heated gases into the shaft, whereby the ore is fully or partially reduced, causing the mass thus obtained to pass without cooling or coming in contact with the air into an electric melting furnace and melting said mass.

2. The herein described process for the production of malleable iron direct from ore which consists in charging a mixture of ore and reducing material into a shaft furnace, heating gases, taken out from the shaft, outside the furnace, introducing said heated gases into a melting chamber, communicating with the furnace, wherefrom it is allowed to pass into contact with the charge in the shaft, whereby the ore is fully or partially reduced, causing the mass thus obtained to pass without cooling or coming in contact with the air into the electric melting furnace and melting said mass.

In witness whereof I have hereunto set my hand in presence of two witnesses.

AXEL RUDOLF LINDBLAD.

Witnesses:
S. NYSTEDT,
EDV. OLANSSON.